United States Patent [19]

Henry et al.

[11] Patent Number: 5,812,813

[45] Date of Patent: Sep. 22, 1998

[54] APPARATUS AND METHOD FOR OF REGISTER CHANGES DURING EXECUTION OF A MICRO INSTRUCTION TRACKING SEQUENCE

[75] Inventors: Glenn Henry; Terry Parks, both of Austin, Tex.

[73] Assignee: Integrated Device Technology, Inc., Santa Clara, Calif.

[21] Appl. No.: 687,918

[22] Filed: Jul. 29, 1996

[51] Int. Cl.⁶ .................................................. G06F 9/38
[52] U.S. Cl. ................................... 395/394; 395/569
[58] Field of Search .................................. 395/392, 393, 395/394, 387, 590, 591, 595, 800.23, 569

[56] References Cited

U.S. PATENT DOCUMENTS

| | | | |
|---|---|---|---|
| 4,901,233 | 2/1990 | Liptay | 395/394 |
| 4,970,641 | 11/1990 | Hester et al. | 395/733 |
| 5,247,624 | 9/1993 | Koumoto et al. | 395/387 |
| 5,355,437 | 10/1994 | Shebanow et al. | 395/394 |

*Primary Examiner*—Parshotam S. Lall
*Assistant Examiner*—Viet Vu
*Attorney, Agent, or Firm*—James W. Huffman

[57] ABSTRACT

An apparatus and method for improving the execution speed of particular micro instruction sequences is provided, and which allows for exception handling of the micro instruction sequences, as needed. During execution of a micro instruction sequence, particular registers are allowed to be overwritten prior to completion of the entire micro instruction sequence. A tracking mechanism is provided which tracks which registers are overwritten, and restoration logic is provided which stores the "old" contents of the particular registers. If the micro instruction sequence cannot complete, due to a fault, for example, the tracking mechanism indicates which registers have been overwritten, and the restoration logic provides the "old" values to be restored.

40 Claims, 5 Drawing Sheets

APPARATUS AND METHOD FOR OF REGISTER CHANGES DURING EXECUTION OF A MICRO INSTRUCTION TRACKING SEQUENCE

BACKGROUND

1. Field of the Invention

This invention relates in general to the field of instruction execution in a processing system, and more particularly to a method and apparatus which tracks register changes during executing of micro instruction sequences.

2. Description of the Related Art

In conventional microprocessor based systems, a computer program is made up of a number of macro instructions that are provided to a microprocessor for execution. The macro instructions are executed, one at a time, to completion, before the next macro instruction begins.

Within the microprocessor is a control unit, or translator, which decodes each macro instruction into a sequence of micro operations, or micro instructions, which are executed to completion, prior to the next macro instruction being decoded. The control unit typically includes a control ROM which contains a number of micro instruction sequences, and translate/decode logic which decodes the macro instructions, and addresses the control ROM to provide the appropriate micro instruction sequence for each macro instruction. When the control unit of the microprocessor receives a macro instruction, it addresses the control ROM which, in turn, provides the appropriate micro instruction sequence to an execution unit.

In more advanced computer systems, another type of microprocessor, called a "pipeline" processor, is used. A pipeline processor decodes macro instructions, similar to those of the conventional microprocessor discussed above, into a sequence of micro instructions. However, the micro instructions are overlapped during execution to improve performance. Such overlapping of micro instructions during execution is known as "pipelining". Pipelining is a key implementation technique used to make fast microprocessors.

A pipeline is like an assembly line. Each step in a pipeline operates in parallel with other steps, though on a different micro instruction. Like the assembly line, different steps are completing different parts of a macro instruction in parallel. Each of these steps is called a pipe stage or a pipe segment. The stages are connected one to the next to form a pipe. Instructions enter at one end, progress through the stages, and exit at the other end.

Flow of instructions through a pipeline is typically controlled by a system clock, or processor clock signal. For example, during a first clock cycle, a first macro instruction may be fetched from memory. By the end of the clock cycle, the first macro instruction is placed into a buffer which feeds a translate/decode stage. During a second clock cycle, a second macro instruction may be fetched and placed into the buffer. In addition, and in parallel to the second macro instruction fetch, the first macro instruction is "read" by the translate/decode logic, and translated into a sequence of micro instructions. By the end of the second clock cycle, a first micro instruction in the sequence is provided to the instruction register. During a third clock cycle, the first micro instruction is provided to later stages in the pipeline, and a second micro instruction is stored in the instruction register. This pipeline process continues indefinitely as long as macro instructions can be fetched into the buffer during each clock cycle, and as long as the translate/decode logic can provide micro instructions to later stages in the pipeline during each clock cycle.

During execution of a micro instruction sequence, an exception may occur. Exceptions are unusual or invalid conditions associated with the execution of a particular micro instruction. In x86 architecture microprocessors, it is typical to classify exceptions as either a fault, a trap, or an abort, depending on when it is reported, and whether the program causing the exception can be resumed.

A fault is an exception that is reported before the macro instruction that causes the exception is complete. For example, in an x86 microprocessor, the code segment (CS) register, and the instruction pointer (EIP) values are pushed onto a stack before transferring control to the exception handler. These values point to the macro instruction causing the fault. Once the problem causing the exception has been fixed, the faulting program can be resumed by executing the IRET micro instruction, which pops the CS and EIP values off the stack.

However, as was mentioned above, the macro instruction which caused the fault is decoded, by the control unit, into a sequence of micro instructions. It is during execution of these micro instructions that the fault occurs. If during execution of a particular micro instruction sequence, one of the micro instructions is allowed to modify either the CS or EIP register, a subsequent fault causing micro instruction will push the wrong values on the stack. Thus, upon completion of an exception correction routine, when the IRET micro instruction pops the CS and EIP values off the stack, program flow will not return to the desired location.

One solution to this problem has been to prevent particular register values within the processor from being modified until verification logic has determined that the entire micro instruction sequence can be (or has been) executed to completion without a fault occurring. In some instances, the "new" register values are held in temporary locations until the micro instruction sequence is complete, before they are allowed to overwrite the "old" register values. This solution, however, requires complex hardware to store the "new" values into temporary registers, and to allow the "new" values to be used in subsequent micro instructions within a particular sequence, prior to completion of the entire sequence. And, upon completion of the micro instruction sequence, additional time is required to write the "new" values into the CS and EIP registers. Therefore, delaying the modification of particular registers within the processor creates additional processing requirements that hinder performance, and add cost to the processor.

SUMMARY

For the foregoing reasons, there is a need for an apparatus and method which tracks register changes during execution of a micro instruction sequence, and which provides for restoration of changed registers if a fault occurs during the micro instruction sequence.

To address the above-detailed deficiencies, it is an object of the present invention to improve the processing speed of micro instruction sequences which require, as part of their execution, modification of processor registers.

It is also an object of the present invention to allow micro instructions within a micro instruction sequence to overwrite particular processor registers, without first determining whether the micro instruction sequence will create a fault.

It is therefore a feature of the present invention to provide a processing system, having a micro instruction tracking mechanism, where the processing system includes: an instruction cache, for storing a macro instruction; translate/decode logic, connected to the instruction cache, for translating the macro instruction into a sequence of micro instructions; an instruction register, for storing the sequence of micro instructions; a register file, connected to the instruction register, for storing data referenced by the sequence of micro instructions; an address stage, connected to the register file, for utilizing the referenced data to calculate operand addresses for the sequence of micro instructions; a write back stage, connected to the register file, for writing results into the register file; and instruction tracking logic, connected to the instruction register, for tracking particular locations within the register file, and for indicating which of the particular locations have had the results written into them.

An additional feature of the present invention is to provide the processing system, as described above where the instruction tracking logic further includes: a plurality of status bits, one bit corresponding to each of the individually addressable segment registers, wherein the status bits are set when the corresponding segment register has the results written into it.

Yet another feature of the present invention is to provide a pipeline microprocessor, for executing a macro instruction, where the pipeline microprocessor includes: an instruction cache, for storing the macro instruction; and translate/decode logic, for translating the macro instruction into a sequence of micro instructions. The translate/decode logic includes: a control ROM, the control ROM for storing a plurality of micro instructions, and for storing a plurality of exception routines. The pipeline microprocessor also includes: an instruction register, connected to the translate/decode logic, for temporarily storing the sequence of micro instructions; and a register file, connected to the instruction register. The register file includes: a first plurality of registers for temporarily storing data; and a second plurality of registers for storing address information. The pipeline microprocessor also includes: a write back stage, connected to the register file, for selectively overwriting the second plurality of registers; and instruction tracking logic, connected to the instruction register, for tracking, for each micro instruction within the sequence of micro instructions, which of the second plurality of registers are overwritten.

A further feature of the present invention is to provide the pipeline processor as described above, where the instruction tracking logic further includes: a plurality of status bits, corresponding to each of the second plurality of registers, which are set by the instruction tracking logic as each of the corresponding second plurality of registers are overwritten.

An additional feature of the present invention is to provide the pipeline processor, as described above, where the processor further includes: restoration logic, connected to the register file, for temporarily storing the prior contents of the second plurality of registers that are overwritten.

Yet another feature of the present invention is to provide a method for executing a macro instruction within a pipeline processing system, the pipeline processing system having a plurality of registers, and tracking logic corresponding to the plurality of registers. The method includes the steps of: decoding the macro instruction into a sequence of micro instructions; executing the sequence of micro instructions; tracking which of the plurality of registers are modified during the step of executing; if a fault occurs during the step of executing: utilizing the step of tracking to determine which of the plurality of registers requires restoration; and clearing the tracking logic upon completion of the step of executing the sequence of micro instructions.

An advantage of the present invention is that execution of particular micro instructions within a micro instruction sequence need not be delayed until determining whether or not a fault will occur in the sequence.

An additional advantage is that micro instruction sequences can operate without delay, by providing a mechanism for restoring register contents should a fault occur.

Additional objects, features and advantages of the invention will be described hereinafter. Those skilled in the art should appreciate that they can readily use the disclosed conception and specific embodiment as a basis for designing or modifying other structures for carrying out the same purposes of the present invention.

DESCRIPTION OF THE DRAWINGS

The present invention will become better understood with regard to the following description, and accompanying drawings where.

DETAILED DESCRIPTION

Figure 1:
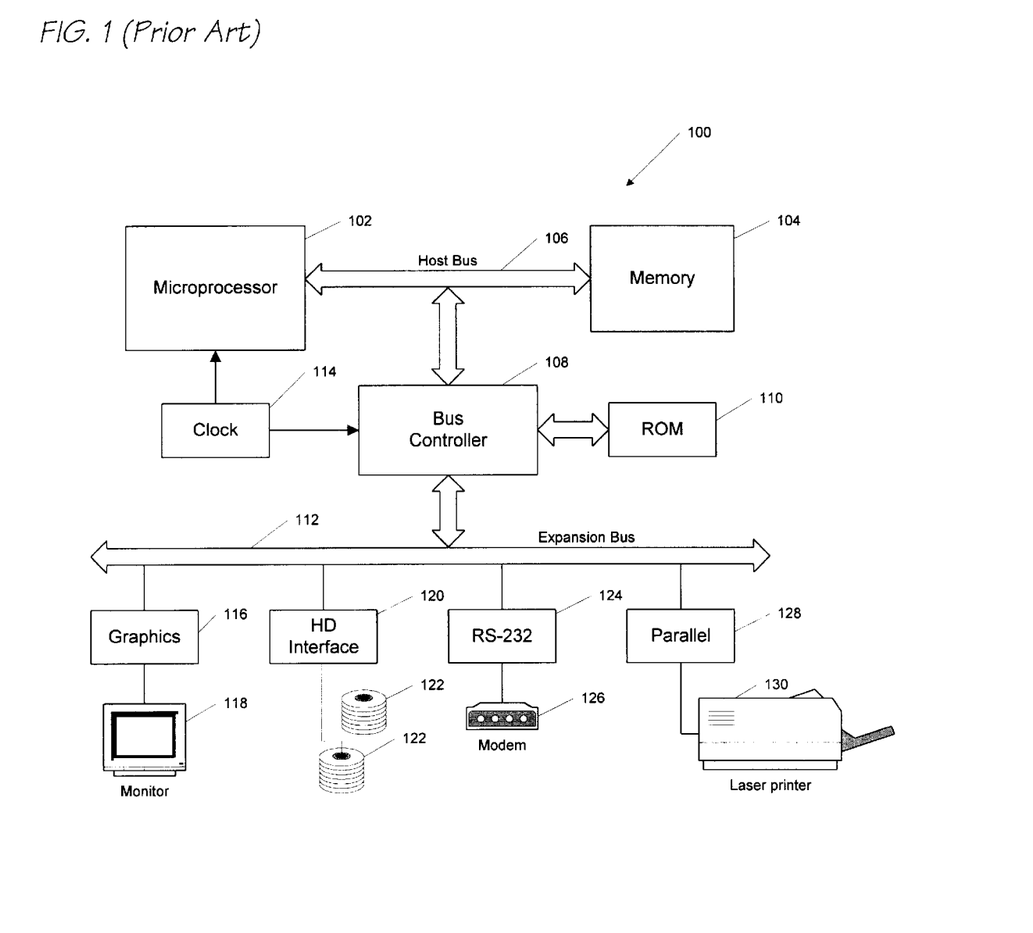
FIG. 1 is a prior art block diagram of a computer system which can incorporate a processor according to the present invention.

Referring to FIG. 1, a block diagram of a typical computer system 100 is shown. The computer system 100 illustrates an exemplary environment for the processor incorporating the present invention. The computer system 100 includes a microprocessor 102 connected to a memory 104 via a host bus 106. Also connected to the microprocessor 102 and the memory 104 via the host bus 106 is a bus controller 108. The bus controller 108 provides an interface between the host bus 106 and a ROM 110, and an expansion bus 112. A system clock 114 is provided to both the microprocessor 102 and the bus controller 108. Connected to the expansion bus 112 is a monitor 118 via a graphics controller 116, hard disk drives 122 via a disk interface 120, a modem 126 via an RS-232 interface 124, and a printer 130 via a parallel port 128.

In operation, the microprocessor 102 executes macro instructions retrieved from either the memory 104, the ROM 110 or the hard disks 122. The microprocessor can retrieve data from or store data to the memory 104 or the hard disks 122. In addition, the microprocessor can send data to either the modem 126 or the printer 130. A user interface to the microprocessor is provided by the monitor 118. The computer system 100 is typical of the type of computing system environment into which a pipeline processor according to the present invention may be used.

Figure 2:
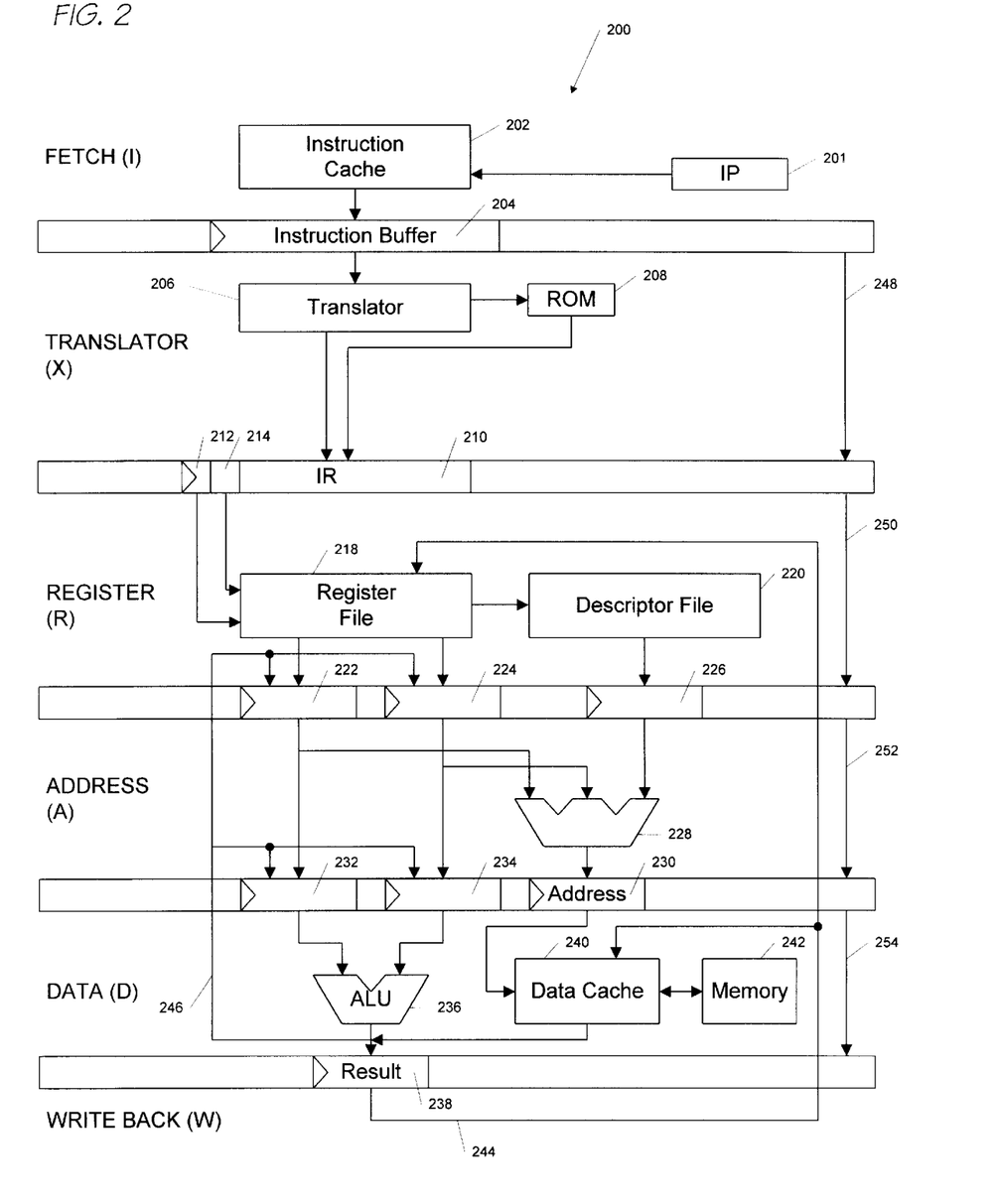
FIG. 2 is a six-stage pipeline processor which can incorporate the method and apparatus of the present invention.

Referring to FIG. 2, a block diagram of a pipeline processor 200 which may incorporate the present invention is provided. The processor 300 has a six stage pipeline. Briefly, the pipeline stages are I (Fetch instruction); X (Translate/decode instruction); R (Register access); A (Address calculation); D (Data manipulation or retrieval); and W (Write Back). During the fetch stage, the processor 200 sends out a value from the instruction pointer 201 to fetch the next macro instruction from an instruction cache 202. The instruction cache 202 places the macro instruction into an instruction buffer 204. The instruction buffer 204 holds the macro instruction that will be needed in subsequent clock cycles. Other buffers, registers, etc. may be placed between the fetch stage and the translate/decode stage, or between other stages in the processor 200, as required. However, for ease of illustration, only specific buffer and registers have been called out.

The translate/decode stage reads the macro instruction located in the instruction buffer 204 into the translator 206. The translator 206 decodes the macro instruction into a sequence of micro instructions, and provides the micro instructions, one at a time, to an instruction register 210. Depending on the complexity of the macro instruction, and the goals of the designer, the micro instruction sequence may be provided either directly by the translator 206, by a control ROM 208, or by a combination of both.

As shown, the instruction register 210 contains a number of sections 212 and 214 which may be used to store information relating to the operands upon which the micro instructions will operate. These sections are provided to a register file 218 and to a descriptor register file 220 during the register stage of the pipeline. The contents of sections 212, 214 access specific registers in the register file 218 and select the contents of those registers to be output into two temporary registers 222, 224 for use in later clock cycles. Likewise, the contents of sections 212, 214 are used to access particular descriptor registers in the descriptor register file 220 which is output into a third temporary register 226. Temporary register 226 is used in later cycles to calculate an address for an operand.

When a micro instruction requires access to a memory location, either for Load or Store operations, the address stage calculates the effective address. The address is calculated by providing the contents of registers 222, 224, and 226 as inputs to an ALU circuit 228. The ALU circuit 228 selects appropriate inputs, and stores the effective address in an address register 230. For micro instructions which do not require calculation of an effective address, the contents of registers 222, 224 are forwarded directly to temporary registers 232, 234 for use in later stages.

During the data stage, one of two operations occur. The first operation provides the contents of the registers 232, 234 as inputs to an ALU 236 for operation thereon. The result of the operation is placed in a result register 238. A second operation occurs when the micro instruction is not an ALU operation, but rather a Load or Store operation from memory. In this instance, the address in register 230 is provided as input to a data cache 240 to load data therefrom. If the operation is a Load, the data in the data cache 240 is placed in the result register 238. If the data does not reside in the data cache 240, the cache 240 accesses a memory 242, retrieves the requested data, and places the data in the result register 238.

During the write back stage, the contents of the result register 238 are written into either the data cache 240 (if a memory operation), or the register file 218 (if a register operation), via signal line 244. Prior to the write back stage, however, the output of the ALU 236 or the data cache 240 are provided on a forward/bypass bus 246 as possible inputs to temporary registers 222, 224, 232, or 234, for use in later processor cycles. Use of the forward/bypass bus 246 allows use of the value in the result register 238 as an input to either the ALU circuit 228, or the ALU 236 on the next processor cycle.

In addition to the buffers and registers called out in FIG. 2, other information relating to micro instructions may be passed from stage to stage along buses 248, 250, 252 and 254. Thus, FIG. 2 shows how an instruction flows through the data path of pipeline processor 200. At the end of each clock cycle, every value computed during that clock cycle and required on a later clock cycle is written into a storage device, which may be a memory 242, a register file 218, or a temporary register.

Figure 3:
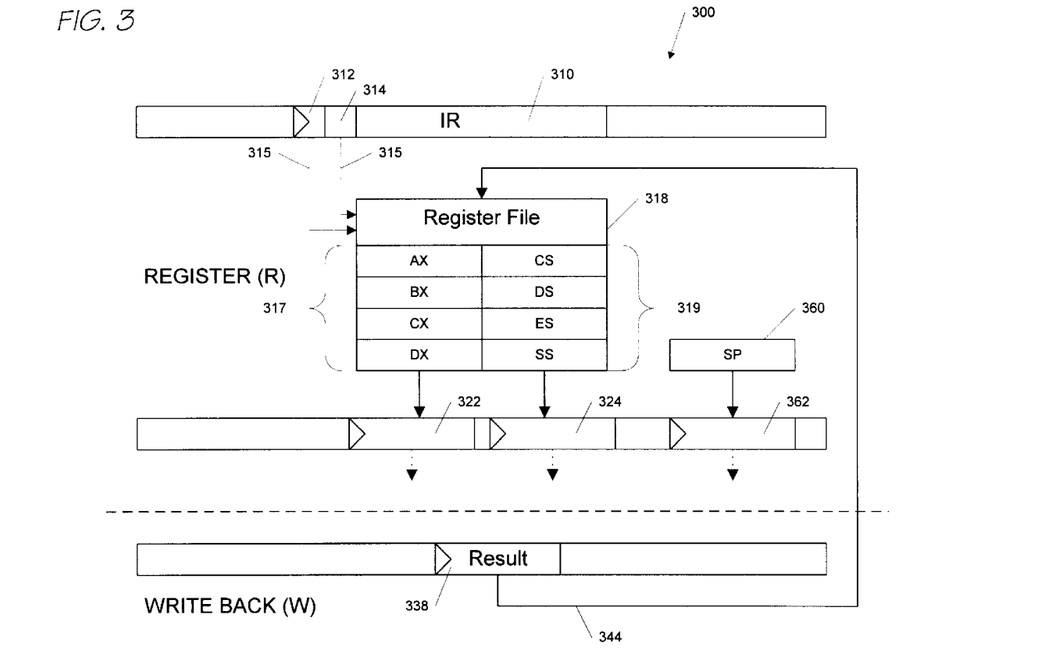
FIG. 3 is a portion of the processor of FIG. 2 illustrating the register file and the stack pointer.

Now referring to FIG. 3, a portion of the pipeline processor 200 is shown, particularly illustrating the register stage and the write back stage. The dashed line indicates that other stages may exist between the register stage and the write back stage, but have been eliminated from FIG. 3 for ease of illustration. Like numerals refer to like elements except that the prefix 3 replaces the prefix 2 in the hundreds digit.

The processor 300 has an instruction register 310 which provides micro instructions, one at a time, to following stages in the pipeline. The instruction register has two portions 312, 314 which are used to store operand information associated with each of the micro instructions. The operand information is provided to a register file 318 via signal buses 315. One skilled in the art will appreciate that the operand information may select particular registers within the register file 318 for use in the associated micro instruction.

In one embodiment, the register file 318 contains a plurality of data registers 317, and a plurality of segment registers 319. The data registers 317 may be used to temporarily store data to be operated upon, or address information which will be used to calculate the effective address of data to be operated upon. The segment registers 319 are used to store selector/descriptor information used by the processor 200 to reference particular memory locations. For a better understanding of the use of segment registers, please see U.S. Pat. No. 4,972,338, Crawford et al., entitled "MEMORY MANAGEMENT FOR MICROPROCESSOR SYSTEM", which is hereby incorporated by reference.

As particular registers within the register file 318 are selected by the operands in locations 312, 314, those registers provide their contents to temporary buffers 322, 324 for use in later stages of the pipeline. Referring again to FIG. 2, such stages may include an address stage and a data stage. The result of later stage operations is placed into a result register 338. This result is then written back, as dictated by a particular micro instruction, into one of the registers 317, 319 within the register file 318.

Also shown in FIG. 3 is a stack pointer register 360. The stack pointer register 360 is used by the processor 300 to hold an offset to the top-of-stack in the current stack segment. It is used by PUSH and POP operations, subroutine calls and returns, exceptions, and interrupts. When an item is pushed onto the stack (in memory), the processor decrements the stack pointer register 360, then writes the item referenced by the new offset. When an item is popped off the stack, the processor copies it from the location referenced by the offset, then increments the stack pointer register 360. The stack pointer register 360, when selected, will output its contents into a temporary buffer 362. For simplification, the stack pointer register 360 has been shown to exist within the register stage of the processor 300. However, one skilled in the art will appreciate that the stack pointer register 360 may actually reside in a different stage in the pipeline.

With the above as background to pipeline processor architecture, attention will now turn to execution of an exemplary macro instruction which illustrates the problem to which the present invention is directed.

Figure 4:
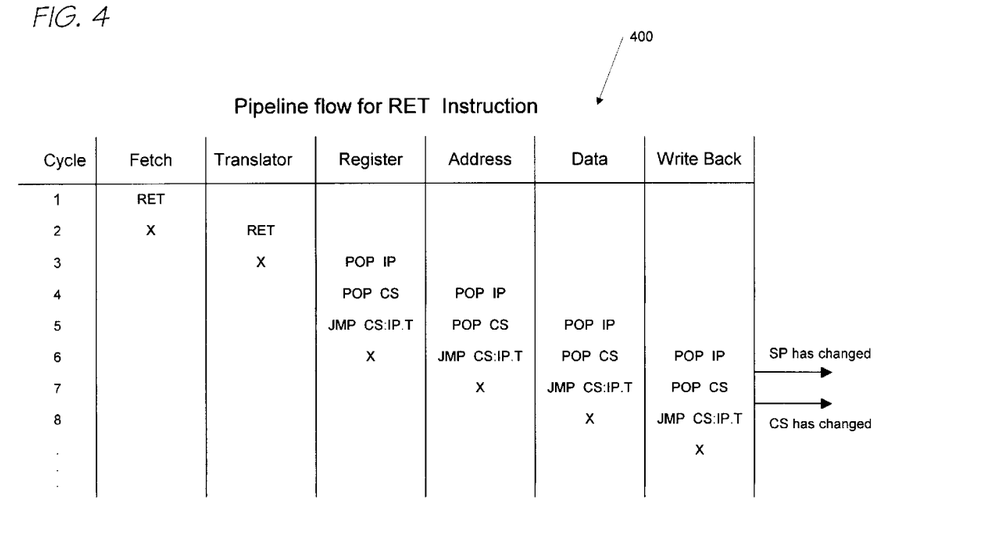
FIG. 4 is a table illustrating instruction flow for a RET instruction in the pipeline processor of FIG. 2.

Now referring to FIG. 4, an instruction flow table 400 is shown for a RET (return) macro instruction. A RET instruction is often used in programming to cause the processor to RETurn from a CALLed subroutine back to a main program. On the left side of the table 400 are clock cycles 1 . . . 8 which indicate synchronous states which progress through a pipeline processor. Along the top of the table 400 are the pipeline stages: Fetch (I); Translator (X); Register (R); Address (A); Data (D); and Write Back (W). These stages correspond to the pipeline stages illustrated in FIG. 2.

Referring now to FIGS. 2–4, execution begins at clock cycle 1. During clock cycle 1, a RET macro instruction is fetched from the instruction cache 202 and placed in the instruction buffer 204. The macro instruction RET is the assembly level directive to indicate that a RET operation is to be executed.

During clock cycle 2, the translator 206 reads the contents of the instruction buffer 204 and decodes the RET instruction. In addition, the translator 206 begins addressing the control ROM 208 to output the micro instruction sequence which performs the function of the RET macro instruction. The first micro instruction in the sequence is POP IP. This instruction will cause the contents of the stack, referenced by the offset stored in the stack pointer register 360, to be written into the instruction pointer 201. The micro instruction is provided to the instruction register 210 at the end of clock cycle 2. One skilled in the art will appreciate that decoding of the macro instruction, or retrieval of the first instruction in the micro instruction sequence may take longer than one clock cycle.

During clock cycle 3, the POP IP flows through the register stage, and into the instruction buffer (not shown) between the register stage and the address stage. The register file 318 is accessed to provide the contents of the SS (stack segment) register to the temporary buffer 324 for use in calculating the memory address for the desired data. In addition, the contents of the stack pointer register 360 are provided to the temporary buffer 362, and the stack pointer register 360 is incremented. In addition, the second micro instruction in the sequence, POP CS, is provided by the control ROM 208 to the instruction register 210. The POP CS micro instruction will cause the contents of the stack, pointed to by the stack pointer register 360, to be written into the code segment register within the register file 318.

During clock cycle 4, the POP IP micro instruction proceeds through the address stage of the pipeline. The contents of temporary buffers 324 and 362 are provided as inputs to the ALU 228 to calculate the desired memory address of the stack. The ALU 228 calculates the effective address of the stack, and provides the address to the address buffer 230. In addition, the POP CS micro instruction is in the register stage of the pipeline. This instruction retrieves the contents of the SS register from the register file 318 and places it in temporary buffer 324. In addition, the offset stored in the stack pointer register 360 is provided to the temporary buffer 362, and the stack pointer register 360 is incremented. Finally, the third micro instruction in the sequence, JMP CS:IP.T, is provided by the control ROM 208 to the instruction register 210.

During clock cycle 5, the POP IP instruction proceeds through the Data stage of the pipeline. The address stored in the address buffer 230 is used to retrieve the contents of the stack from either the data cache 240 or the memory 242. The result of the retrieval is placed into the result register 238. In addition, the POP CS instruction proceeds through the address stage where the contents of the temporary buffers 362 and 324 are provided as inputs to the ALU 228. The ALU 228 calculates the effective address for the stack and places it into the address buffer 230. Finally, the micro instruction JMP CS:IP.T proceeds through the register stage of the pipeline.

During clock cycle 6, the POP IP micro instruction is in the write back stage of the pipeline. The results of the stack retrieval were placed into the result register 238 during clock cycle 5. This result is now written into the instruction pointer 201. In addition, the POP CS micro instruction is in the data stage of the pipeline. It uses the contents of the address buffer 230 to retrieve the contents of the stack from either the data cache 240 or the memory 242. The result of the retrieval is placed into the result register 238. Finally, the JMP CS:IP.T micro instruction proceeds through the address stage of the pipeline. As one skilled in the art will appreciate, the values of CS and IP have been retrieved by the two previous POP micro instructions, but were not written into the register file 318 at the time the JMP instruction passed through the register stage. Normally, this would create a hole in the pipeline. However, as is known in the art, the forward/bypass bus 246 is used to provide the previously retrieved values of CS and IP to the temporary buffers 222, 224 to be used as inputs to the address ALU 228, as needed. The CS and IP values are input into the ALU 228 and the effective address for the JMP is stored in the address register 230.

During clock cycle 7, the POP CS micro instruction proceeds through the write back stage. This instruction causes the contents of the result register 238 to be written into the CS register within the register file 318. In addition, the JMP CS:IP.T micro instruction proceeds through the data stage in the pipeline. Since no data needs to be retrieved, the contents of the address buffer 230 (the effective address of CS:IP) are placed into the result register 238.

During clock cycle 8, the JMP CS:IP.T micro instruction causes program flow to branch to the address stored in the result register 238.

The above description of program flow for the macro instruction RET illustrates how individual registers associated with the RET instruction, SP and CS, are modified, at different times, by different micro instructions in the sequence. If no faults or interrupts occur during the execution of the micro instruction sequence, then no harm will have been done by allowing the IP and CS registers to be overwritten. However, as was discussed in the background above, if any of the micro instructions in the sequence create a fault condition, program execution will jump to an exception handler prior to completing the sequence. Upon return from the exception handler, the correct values of CS and SP will be needed to return to the RET macro instruction. If either of these registers have been overwritten before the fault occurs, the exception handler will not be able to return.

Figure 5:
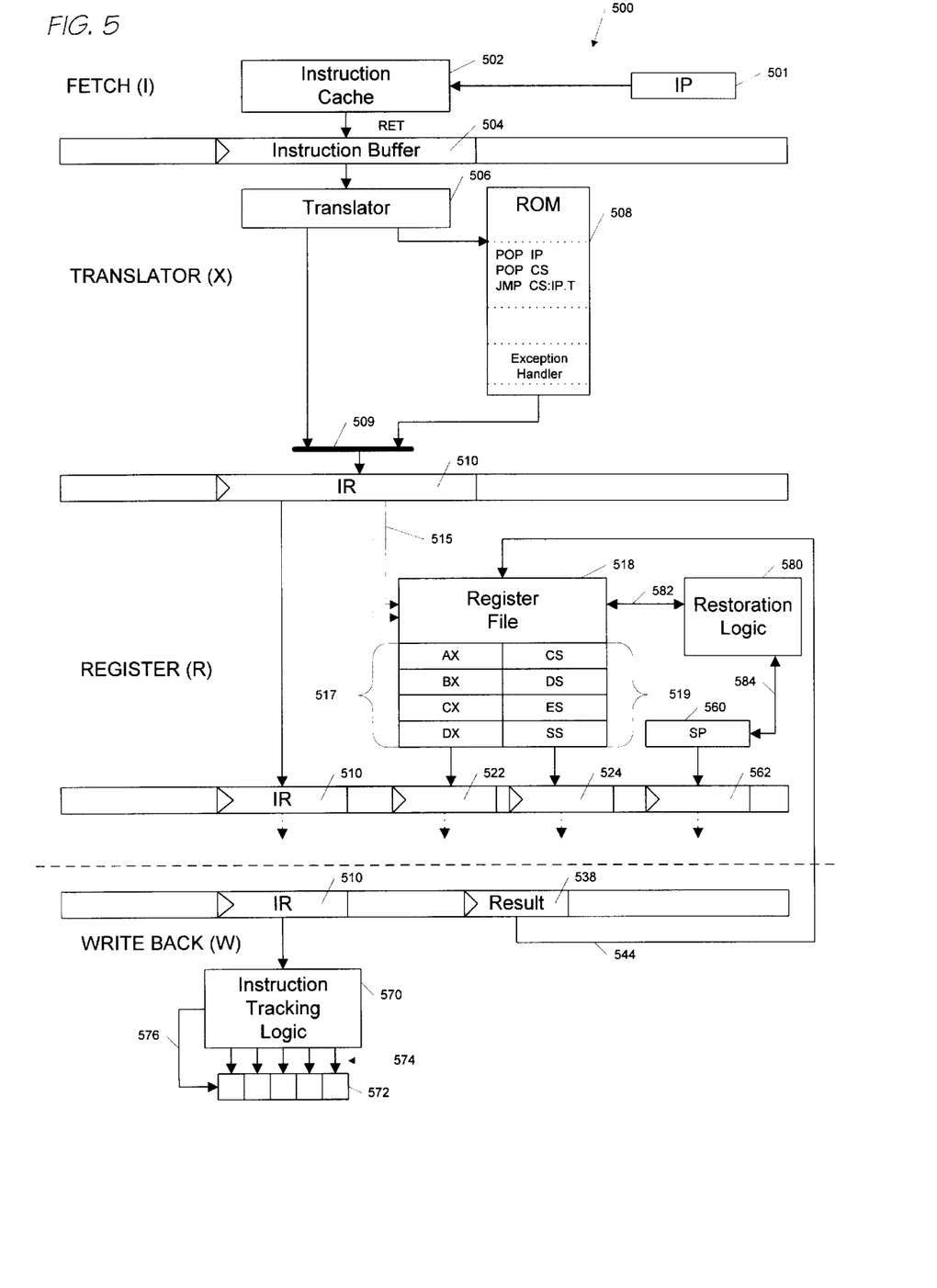
FIG. 5 is a pipeline processor which incorporates the instruction tracking logic, and the restoration logic of the present invention.

Now referring to FIG. 5, a portion of a pipeline processor 500 is shown which incorporates the method and apparatus of the present invention. The processor 500 has a dashed line between the register stage and the write back stage to indicate that other stages may be placed between them. Like numerals refer to like elements with the prefix 5 replacing the prefixes 2 and 3 in the hundreds digit.

The processor 500 includes an instruction cache 502 connected to an instruction buffer 504. The instruction cache 502 is referenced by an instruction pointer 501. The instruction cache 502 is shown providing the RET macro instruction to the instruction buffer 504. The instruction buffer 504 is connected to a translator 506. The translator 506 decodes the macro instruction RET and selects a micro instruction sequence from the control ROM 508 which performs the function of the RET macro instruction. The control ROM 508 provides the micro instruction sequence, one instruction at a time, to the mux 509. The mux 509 selects micro instructions from either the translator 506 or the control ROM 508 to be input into the instruction register 510.

The instruction register 510 is shown between multiple stages in the pipeline. While not shown in FIGS. 2 and 3, it is understand that micro instructions proceed down the pipeline in instruction registers 510 associated with each stage. The instruction register 510 provides operand information to a register file 518 via signal buses 515. The signal buses select particular registers 517, 519 to be output to temporary buffers 522, 524 for use in later stages of the pipeline.

Also shown in the register stage is a stack pointer register 560 connected to a temporary buffer 562. Operation of the processor 500, thus far, is similar to that described above with reference to FIGS. 3 and 4. The processor 500 also contains restoration logic 580 connected to both the register file 518, via bus 582, and the stack pointer register 560, via bus 584. Operation of the restoration logic 580 will be discussed below with reference to FIG. 7.

In the write back stage of the processor 500 is instruction tracking logic 570. The instruction tracking logic is shown connected to the instruction register 510. The instruction tracking logic 570 includes a plurality of status bits 572 which are connected to the instruction tracking logic 570 via bus signals 574. A clear status signal 576 is also shown between the status bits 572 and the instruction tracking logic 576.

Operation of the present invention will now be described with reference to FIGS. 4 and 5. As the micro instruction sequence proceeds down the pipeline, the contents of the stack pointer register 560, and the CS register will be changed prior to completion of the micro instruction sequence. In fact, the stack pointer register 560 will be changed at the end of clock cycle 6, during the write back of the micro instruction POP IP. And, both the CS and SP registers will be changed at the end of clock cycle 7, during the write back of the micro instruction POP CS.

If during execution of the JMP CS:IP.T micro instruction, a fault occurs, the processor 500 will PUSH the contents of the CS and IP registers onto the stack, at the location pointed to by the stack pointer register 560. If the contents of the CS, IP and SP registers have not yet been overwritten, then upon completion of the exception correction routine, a POP will occur which will restore CS and IP, causing the RET macro instruction to restart. If, however, the CS or SP registers have been changed, then the PUSH/POP operation of the exception handler will not be able to return to the RET macro instruction.

In our invention, when the POP IP micro instruction reaches the write back stage, the instruction tracking logic 570 sets a bit in the status bits 572 which is associated with the stack pointer register 560. In one embodiment, there exists a status bit corresponding to each of the segment registers 519, as well as the stack pointer register 560. When the POP CS micro instruction reaches the write back stage, the instruction tracking logic 750 sets a bit in the status bits 572 which is associated with the CS register. In addition, if the bit associated with the stack pointer register 560 has not previously been set, the instruction tracking logic 570 will set it as well. Thus, as any of the segment registers 519, or the stack pointer register 560, are overwritten by a micro instruction, the instruction tracking logic 570 sets a corresponding bit in the status bits 572. In the event of a fault, these bits 572 may be checked, as described below, to determine which of the registers needs to be restored.

In addition, the instruction tracking logic 570 looks at each micro instruction to determine whether the micro instruction is the last instruction in a sequence, indicating that the macro instruction is complete. In one embodiment, the suffix. T is used to indicate the end of a micro instruction sequence. Upon receipt of a micro instruction with a. T suffix, the instruction tracking logic 570 clears the status bits 572 via the clear status signal 576.

Figure 6:
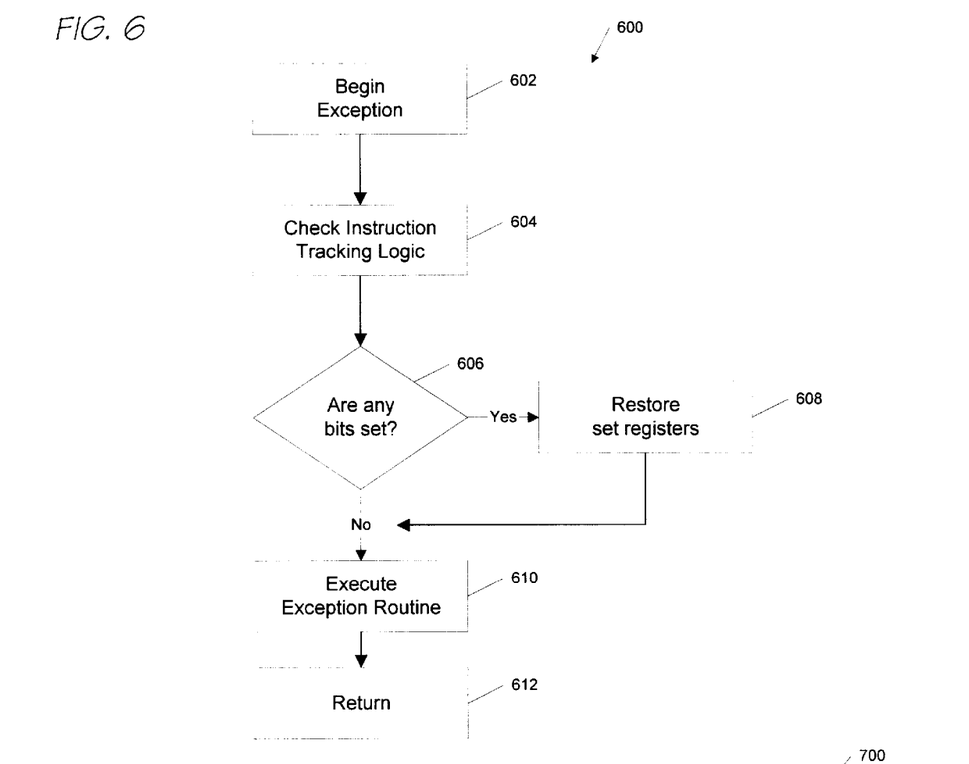
FIG. 6 is a flow chart illustrating an exception correction routine which utilizes the method and apparatus of the present invention.

Now referring to FIG. 6, a flow chart 600 is shown which illustrates operation of the instruction tracking logic 570, along with the restoration logic 580 upon the occurrence of an exception. As stated above, at any time during execution of a micro instruction sequence, a fault condition may occur which causes the processor to branch to the exception handler and PUSH the contents of the IP and CS registers on the stack. However, in the present invention, prior to pushing CS and IP onto the stack, the program sequence illustrated in the flow chart 600 is executed.

Flow begins at step 602 when the exception begins. Flow proceeds to step 604 where the exception handler reads the status bits 572 in the instruction tracking logic 570. Flow then proceeds to step 606.

At step 606, the exception handler determines whether any of the status bits 572 have been set. If not, then flow proceeds to step 610 which begins execution of the exception routine. As noted above, this will first cause the CS and IP registers to be pushed onto the stack. The exception routine will correct the condition causing the fault, the CS and IP values will be popped off the stack, and instruction execution will return to the macro instruction which caused the fault, at step 612.

If any of the status bits 572 are set, then flow proceeds to step 608. At step 608, the exception handler causes the restoration logic 580 to restore the old contents of the SP and CS registers prior to proceeding to step 610. Once the contents of SP and CS are restored, the CS and IP values can be pushed onto the stack, at step 610, as above. After completion of the exception routine, execution will return to the macro instruction which caused the fault, at step 612.

By allowing the contents of the CS and SP registers to be overwritten during execution of the micro instruction sequence, no performance penalty has been added in the case where no fault occurs. This provides a significant performance improvement during the execution of micro instruction sequences. And, by providing instruction tracking logic, and restoration logic, corrections may be made, as needed, if faults occur in the middle of a micro instruction sequence.

Figure 7:
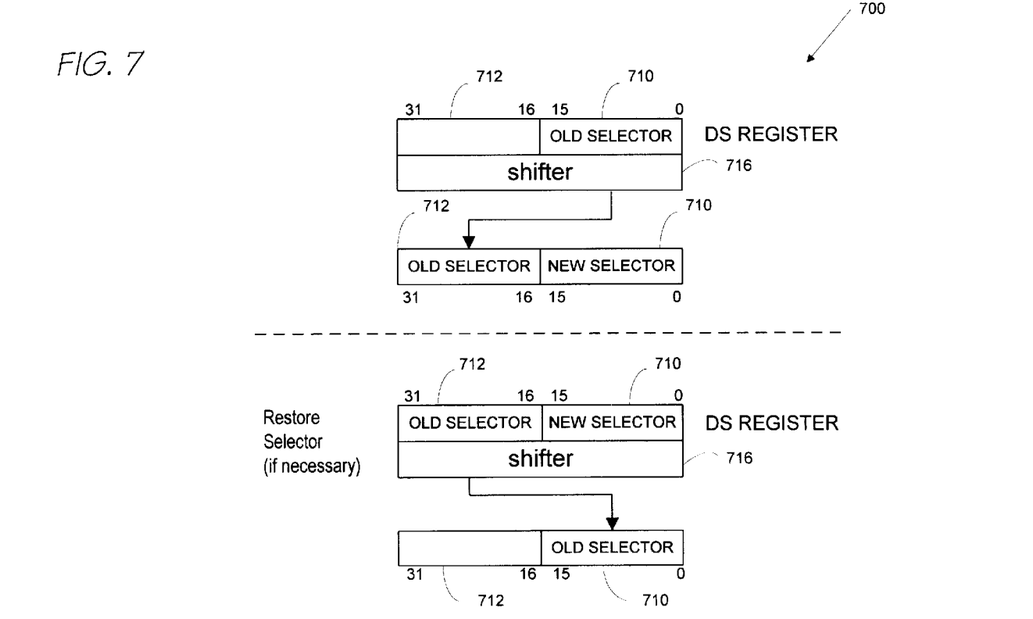
FIG. 7 is an exemplary restoration mechanism which can be used as the restoration logic shown in FIG. 5.

To better understand the operation of the restoration logic 580, reference is now made to FIG. 7. In FIG. 7, an apparatus and method is shown for saving the "old" value of a selector in a segment register, writing a "new" value into the segment register, and restoring the "old" selector value, as needed.

For purposes of illustration, a DS segment register 700 is shown. In typical x86 microprocessors, segment registers have 16-bit selectors. In one embodiment of the present invention, the register file provides a 32 bit register for storing the selector. The actual selector is stored in the lower 16-bits 710 of the segment register 700. As a "new" selector is written into the segment register 700, the "old" selector passes through a shifter 716, and is written into the upper 16-bits 712 of the segment register 700. if restoration of the "old" selector is needed, the shifter 716 places the contents of the upper portion 712 of the segment register 700, into the lower portion 710. For a complete description of the operation of the selector restoration invention, please see U.S. Pat. No. 5,787,495 Ser. No. 08/572,898 entitled "METHOD AND APPARATUS FOR SELECTOR STORING AND RESTORATION" to Glenn Henry et al., which is hereby incorporated by reference.

Although the present invention has been described in considerable detail with reference to certain preferred versions thereof, other versions are possible. For example, the restoration logic of FIG. 5 may provide a distinct temporary register for each register which is tracked. As the register is overwritten, a copy of the old contents is stored in its associated temporary register. The exception handler can then read the associated temporary register, as needed, should a restoration be required. In addition, the instruction tracking logic need not have a bit assigned to each of the registers which are tracked. Rather, combinational logic may be used to reduce the number of bits, or to indicate which registers are modified by each micro instruction. An important aspect of the present invention is that particular register contents are allowed to be overwritten during the execution of micro instruction sequences, while tracking of the register changes is performed. Should the need arise for restoration of the registers, if a fault occurs, for example, the tracking mechanism may be used to indicate which registers require restoration.

We claim:

1. A processing system, having a micro instruction tracking mechanism for tracking changes made by micro instructions to directly addressable registers within an architecturally visible register file, the processing system comprising:
   an instruction cache, for storing a macro instruction;
   translate/decode logic, coupled to said instruction cache, for translating said macro instruction into a sequence of micro instructions;
   an instruction register, for storing said sequence of micro instructions;
   an architecturally visible register file, coupled to said instruction register, the register file having a plurality of architecturally visible directly addressable registers for storing data referenced by said sequence of micro instructions;
   a write back stage, coupled to said register file, for writing results directly into said plurality of visible directly addressable registers within said register file, thereby overwriting previous contents of said directly addressable registers; and
   instruction tracking logic, coupled to said instruction register, for tracking said visible directly addressable registers within said register file, and for indicating which of said directly addressable registers have been overwritten by said write back stage;
   wherein the processing system utilizes said instruction tracking logic to restore said visible directly addressable registers within said register file that have been overwritten, as needed; and
   wherein said plurality of directly addressable registers have a one to one logical/physical correspondence.

2. The processing system, as recited in claim 1, wherein said processing system is a microprocessor.

3. The processing system, as recited in claim 2, wherein said instruction cache is a cache memory located within said microprocessor.

4. The processing system, as recited in claim 1, wherein said translate/decode logic further comprises:
   a translator, connected to said instruction cache, for selecting said sequence of micro instructions, from a plurality of micro instructions, to be associated with said macro instruction; and
   a control ROM, connected to said translator, for storing said plurality of micro instructions, and for providing said sequence of micro instructions to said instruction register.

5. The processing system, as recited in claim 4, wherein said control ROM further comprises:
   an exception handler, for storing a plurality of exception correction routines.

6. The processing system, as recited in claim 4, wherein said translate/decode logic further comprises:
   a mux, connected to both said translator and said control ROM, for selecting between said translator and said control ROM for output to said instruction register.

7. The processing system, as recited in claim 1, wherein said processing system is a pipeline processor.

8. The processing system, as recited in claim 1, wherein said instruction register stores each micro instruction in said sequence, one at a time.

9. The processing system, as recited in claim 1, wherein said architecturally visible register file further comprises:
   a plurality of individually addressable data registers; and
   a plurality of individually addressable segment registers.

10. The processing system, as recited in claim 9, wherein said data referenced by said sequence of micro instructions is stored in said plurality of individually addressable segment registers.

11. The processing system, as recited in claim 10, wherein said register file further comprises a stack pointer register.

12. The processing system, as recited in claim 1, wherein said macro instruction is an x86 assembly instruction.

13. The processing system, as recited in claim 9, wherein said write back stage writes said results into at least one of said plurality of individually addressable segment registers.

14. The processing system, as recited in claim 13, wherein said instruction tracking logic further comprises:
   a plurality of status bits, one bit corresponding to each of said individually addressable segment registers,
   wherein said status bits are set when said corresponding segment register has said results written into it.

15. The processing system, as recited in claim 14, wherein said results are written into said segment register by said write back stage.

16. The processing system, as recited in claim 14, wherein said plurality of status bits are cleared at the end of said sequence of micro instructions.

17. The processing system, as recited in claim 9, wherein said processing system further comprises:
   restoration logic, connected to said register file, for storing old data associated with said plurality of individually addressable segment registers.

18. The processing system, as recited in claim 17, wherein said restoration logic stores said old data as said results are written into said register file.

19. The processing system, as recited in claim 18, wherein exception routines use said restoration logic to restore the contents of said segment registers.

20. The processing system, as recited in claim 19, wherein said contents of said segment registers are selectively restored after a fault occurs.

21. A pipeline microprocessor, for executing a macro instruction, the pipeline microprocessor comprising:

an instruction cache, for storing said macro instruction;

translate/decode logic, coupled to said instruction cache, for translating said macro instruction into a sequence of micro instructions, said translate/decode logic comprising:

a control ROM, said control ROM for storing a plurality of micro instructions, and for storing a plurality of exception routines;

an instruction register, coupled to said translate/decode logic, for temporarily storing said sequence of micro instructions;

an architecturally visible register file, coupled to said instruction register, said register file comprising:

a first plurality of architecturally visible directly addressable registers for temporarily storing data; and a second plurality of architecturally visible directly addressable registers for storing address information;

a write back stage, coupled to said register file, for selectively overwriting said second plurality of registers; and instruction tracking logic, coupled to said instruction register, for tracking, for each micro instruction within said sequence of micro instructions, which of said second plurality of architecturally visible directly addressable registers are overwritten.

22. The pipeline microprocessor, as recited in claim 21, wherein said translate/decode logic further comprises:

a translator, for selecting from said control ROM said sequence of micro instructions from said plurality of micro instructions.

23. The pipeline microprocessor, as recited in claim 21, further comprising:

an execution unit, connected to said register file, and to said instruction register, for executing said sequence of micro instructions.

24. The pipeline microprocessor, as recited in claim 23, wherein said execution unit executes said sequence of micro instructions, sequentially.

25. The pipeline microprocessor, as recited in claim 23, wherein during execution of said sequence of micro instructions, a fault may occur.

26. The pipeline microprocessor, as recited in claim 25, wherein when said fault occurs, execution jumps to one of said plurality of exception routines.

27. The pipeline microprocessor, as recited in claim 26, wherein said one of said plurality of exception routines determines from said instruction tracking logic, which of said second plurality of registers requires restoration.

28. The pipeline microprocessor, as recited in claim 26, wherein said one of said plurality of exception routines determines from said instruction tracking logic, which of said second plurality of registers has been overwritten during execution of said sequence of micro instructions.

29. The pipeline microprocessor, as recited in claim 28, wherein said one of said plurality of exception routines restores said overwritten ones of said second plurality of registers.

30. The pipeline microprocessor, as recited in claim 21, wherein said second plurality of registers comprise segment registers.

31. The pipeline microprocessor, as recited in claim 21, wherein said write back stage performs said selective overwriting of said second plurality of registers for each micro instruction within said sequence of micro instructions.

32. The pipeline microprocessor, as recited in claim 21, wherein said instruction tracking logic further comprises:

a plurality of status bits, corresponding to each of said second plurality of registers, which are set by said instruction tracking logic as each of said corresponding second plurality of registers are overwritten.

33. The pipeline microprocessor, as recited in claim 32, wherein said plurality of status bits are cleared at the end of said sequence of micro instructions.

34. The pipeline microprocessor, as recited in claim 21, wherein said pipeline microprocessor further comprises:

restoration logic, connected to said register file, for temporarily storing the prior contents of said second plurality of registers that are overwritten.

35. The pipeline microprocessor, as recited in claim 34, wherein said restoration logic restores said overwritten ones of said second plurality of registers if a fault occurs.

36. A method for executing a macro instruction within a pipeline processing system, the pipeline processing system having a plurality of architecturally visible directly addressable registers, and tracking logic corresponding to the plurality of registers, the method comprising:

a) decoding the macro instruction into a sequence of micro instructions;

b) executing said sequence of micro instructions;

c) tracking which of the plurality of architecturally visible directly addressable registers are modified during said step b;

d) if a fault occurs during said step b:

d1) utilizing said step of tracking to determine which of the plurality of directly addressable registers requires restoration; and d2) clearing the tracking logic upon completion of said step of executing said sequence of micro instructions.

37. The method for executing a macro instruction, as recited in claim 36, wherein b executes said sequence of micro instructions, sequentially.

38. The method for executing a macro instruction, as recited in claim 36, wherein C sets one of a plurality of status bits for each of the plurality of registers which are modified during said step of executing.

39. The method for executing a macro instruction, as recited in claim 38, wherein d1 reads the status bits to determine which of the plurality of registers were modified during b.

40. The method for executing a macro instruction, as recited in claim 36, further comprising:

e) if a fault occurs, restoring the plurality of registers which are modified during b.

* * * * *

UNITED STATES PATENT AND TRADEMARK OFFICE
CERTIFICATE OF CORRECTION

PATENT NO : 5,812,813
DATED : September 22, 1998
INVENTOR(S) : Henry et al.

It is certified that error appears in the above-identified patent and that said Letters Patent is hereby corrected as shown below:

On the title page, item [54], and column 1:

Delete the Title in its entirety, and substitute the following therefore:

--APPARATUS AND METHOD FOR TRACKING OF REGISTER CHANGES DURING EXECUTION OF A MICRO INSTRUCTION SEQUENCE--

Signed and Sealed this

Twenty-ninth Day of December, 1998

Attest:

BRUCE LEHMAN

*Attesting Officer*   *Commissioner of Patents and Trademarks*